UNITED STATES PATENT OFFICE.

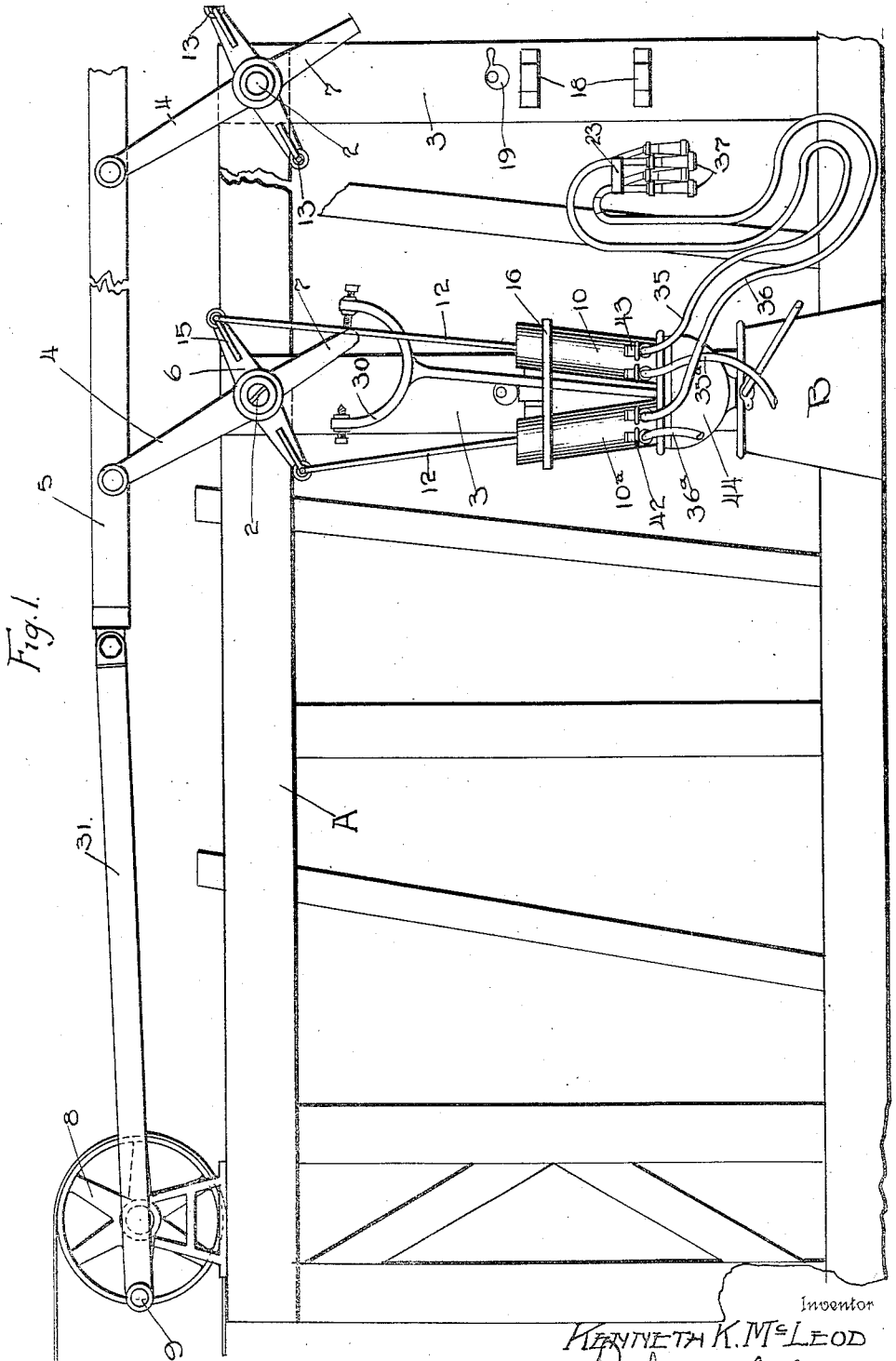

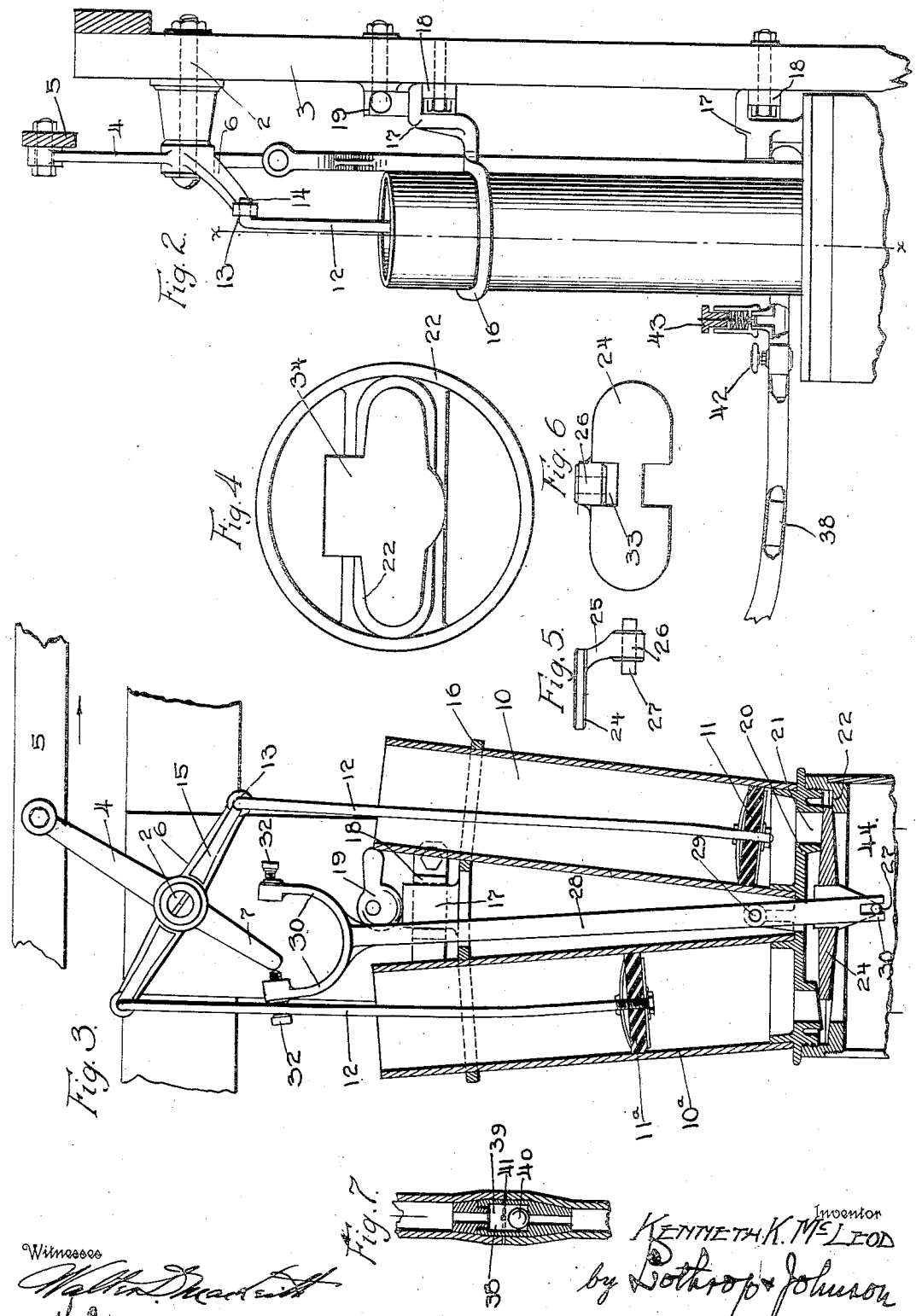

KENNETH K. McLEOD, OF ST. PAUL, MINNESOTA.

MILKING APPARATUS.

1,178,087.     Specification of Letters Patent.     Patented Apr. 4, 1916.

Application filed May 10, 1915. Serial No. 27,130.

*To all whom it may concern:*

Be it known that I, KENNETH K. McLEOD, a citizen of the United States, residing at St. Paul, in the county of Ramsey and State of Minnesota, have invented certain new and useful Improvements in Milking Apparatus, of which the following is a specification.

My invention relates to improvements in milking apparatus of the kind wherein each milking unit is self contained and preferably detachable from the power member so as to be readily interchangeable from one station or one set of cows to another, such for instance as that disclosed in my U. S. Letters Patent No. 1,120,072, of 8th December, 1914.

The object of the invention is to simplify the construction of such apparatus and to make it more efficient and convenient in use.

In milking apparatus of the suction type as now constructed there is interposed between the suction pump and the milk pail or other ultimate receptacle an intermediate milk chamber into which the milk is drawn from the cow on the suction stroke of the pump and from which it is discharged on the return or pressure stroke of the pump, and the valves which control the discharge of the milk are operated by gravity, air pressure, weights, springs or other non positive means, so that they have no positive action and are liable to get out of order and adjustment and render the milking uncertain.

In carrying out my invention I have constructed apparatus in which the milk is drawn from the cow directly into the vacuum cylinders of the pumps below the pistons, thereby dispensing with the intermediate milk chamber above referred to with its additional valve connections, and avoiding the loss of vacuum energy incidental to its use and also the necessity of cleaning and caring for the same. I have also provided a single unitary valve for both pump cylinders, and a plurality of four way rocker arms each of which not only drives the pump pistons of each unit alternately but also operates the valve positively in unison with the pump pistons. These rocker arms are all connected with the same driving element. I have also provided means for controlling the stroke of the valve lever in such way it will remain inactive or neutral until the pump pistons have nearly finished their stroke, so that the valve shall not be operated until just at the end of the stroke of the pump pistons. I have also provided means for enabling each milking unit to be easily disconnected from one rocker arm and attached to another even when the machine is in operation, so that each complete unit of the milking apparatus can be transferred from one station to another and used between another pair of cows, without affecting other units in service operated by the one and same driving element.

More particularly the invention consists in the construction, combination, and arrangement of parts hereinafter described and claimed, the full objects and advantages of which will appear in connection with the detailed description thereof.

In the accompanying drawings illustrating an embodiment of the invention, Figure 1 is a front elevation of a fragment of the frame and power member with one complete milking unit operatively connected therewith; Fig. 2 is a side elevation of the same with the power member and frame partly in cross section; Fig. 3 is a vertical section through the middle of the pump on line $x$—$x$ of Fig. 2; Fig. 4 is a bottom view of the slide way for the unitary valve at the bottom of the pump cylinders; Figs. 5 and 6 are end and bottom views, respectively, of the unitary valve by itself; and Fig. 7 is a longitudinal section through the check valve in the milking tube.

In the drawings A represents the framework. This is preferably long enough to provide for a number of milking stations at each of which a complete milking unit can be supported and connected with the power element as hereinafter explained. At each milking station is a unitary assemblage of bell crank levers which may be appropriately called a "four way rocker arm". This rocker arm is centrally journaled upon a shaft or pin 2 carried by one of the standards 3 of the frame, and has four radial arms, namely, an upwardly extending power arm 4 pivotally connected at its upper end with a reciprocating drive rod 5, a cross arm 6 which passes from side to side through the point of pivotal support of the rocker arm, and a valve operating arm or lug 7 which extends down and forms in effect a continuation or extension of the power arm 4. The reciprocating rod 5 may be operated through the medium of any suitable driving mechanism such as the wheel or disk 8, with the crank pin 9 of which it has driving connection 31. When the rod or bar 5 is reciprocated it will oscillate the four way rocker arm upon its pivotal support. The milking apparatus properly speaking is removably connected with the rocker arm in the manner hereinafter described.

Each milking unit comprises a pair of upright vacuum cylinders 10 and 10ª arranged preferably at an acute angle with each other so that they will be slightly spread at the top and extend downwardly toward each other, thereby accommodating themselves to the direction of stroke of the plungers or pistons 11 and 11ª which work therein. Each plunger or piston has a piston rod 12 which extends up through the cylinder to a pivotal connection with one of the ends of the cross arm 6 of the four way rocker arm. As a suitable and easily operated detachable connection the cross arm is formed at each end with a hole 13 and the upper end of each piston with an angular pin or hook 14 which can be hooked into the respective holes. To facilitate the attachment of the piston rods to the cross arm, particularly when the machine is in motion, the cross arm is formed on each side of its pivotal support with a longitudinal groove 15 leading to the hole 13, so that the hook can be inserted within the groove and then slid along until it enters the opening 13, or if the machine is in motion the rocking of the arm will itself cause the hook to slide outwardly in the groove until it enters the hole 13. The pump cylinders are held together at the top by suitable means such as the encircling band 16 which terminates at the back between the cylinders in a hook 17 which can be hooked into the upper bracket or keeper 18 upon the posts 3. Near the bottom of the cylinders is another hook 17 which can be hooked in like manner into the lower bracket or keeper 18 upon the standard 3. The pumps can then be locked to the standard by means of a cam lever 19 journaled upon the standard in such position that when its handle is thrust down the cam portion will engage the top of the hook 17 and force it into the keeper in a manner well known in the art.

The pump cylinders 10 are secured at the bottom to a removable base plate 20 which as here shown forms the bottom for both of the cylinders and has a discharge port 21 leading from each cylinder. Removably secured to the bottom plate 20 is an open or skeleton frame 22 which forms the supporting slideway for the unitary valve hereinafter mentioned. It may be screwed or otherwise removably secured to the plate 20 in any suitable way, but is spaced apart therefrom a sufficient distance to allow the unitary valve 24 to work between the plate and slideway. The pail B to receive the milk may be placed directly under the cylinders or under a funnel 44 removably secured to the bottom thereof.

The unitary valve 24 is shown by itself in Figs. 5 and 6. It consists of an elongated plate progressively reduced in thickness toward its two ends. On one side of the plate midway between the ends thereof is a pin or stud 27. This is here shown carried by a lug 26 at the lower end of a downwardly projecting arm 25. Straddling this pin with its bifurcated lower end is a valve lever 28, which is fulcrumed upon a horizontal shaft or pin 29 carried by the base plate 20 at a point midway between the cylinders. The lever extends upwardly above the cylinders, and at the top it is formed with forked arms 30 which project up on either side of the downwardly extending lug 7 of the four way rocker arm and into the path of the same when the rocker arm is oscillated. At the upper end of each of the arms 30 is an adjusting screw 32 which extends inwardly through the arm, whereby the distance between the arms and therefore the precise moment of operation of the valve can be regulated. At the bottom the valve stem passes through openings 33 in the valve plate and 34 in the slideway frame 22, these openings being large enough to allow the valve rod to oscillate freely. It will be noticed that the underside of the bottom plate 20 about the outlets 21 is inclined upwardly on each side toward the valve lever, while the upper face of the slideway 22 is inclined downwardly toward the valve rod, so that the valve will close the ports 21 tightly.

Leading from each of the pump cylinders at a point in advance of the piston is a pair of milking tubes, the tubes leading from one cylinder being designated as 35 and 35ª and those from the other cylinder as 36 and 36ª, respectively. At the end of each of these tubes is a pair of teat cups 37. The unit here shown is adapted to milk two cows at once. To milk each cow four teat cups are required and as it is desirable to milk the teats alternately, two at a time, instead of all four at once, one tube from each cylinder is used for each cow, whereby two of the teats will be milked by the suction stroke of one cylinder, and the other two by the suction stroke of the other cylinder. As here shown the tubes 35 and 36 are led off for use upon one cow, and terminate in a cluster of four teat cups held together in a position for ready application to the four udders of the cow by means of a central support 23. Similarly the tubes 35ª and 36 are led off for use upon the other cow.

In order to prevent the air compressed by the return or pressure stroke of the cylinder from dislodging the teat cups from the teats I have interposed in each milking tube at a point near the cylinder an intake check valve 38. In the drawings this is shown in the form of a tubular shell having an enlarged central chamber 39 in which is a ball 40 the longitudinal movement of which is restrained by means of a central web or cross wire 41. The air will thus be forced out through the ports 21 with the drawn milk. I have also placed in each tube near the cylinder an air stop cock 42 of a kind well known in the art, so that the suction energy may be shut off from any tube independently of the others, and a suction regulating valve 43 to regulate the suction energy according to the requirements of the different cows, some being harder to milk than others.

The operation of the apparatus is as follows: When the drive rod 5 is at the extreme limit of its travel in the direction of the arrow in Fig. 3 the piston 11 in cylinder 10 will be at the end of its downward or pressure stroke while the piston 10ᵃ in cylinder 11ᵃ will be at the end of its upward or suction stroke and the valve 24 in position where it will close the outlet port 21 from cylinder 10, and open the corresponding port from cylinder 10ᵃ. The space below the piston in cylinder 10ᵃ will contain the milk just drawn. As the drive rod moves to the left on its return stroke, the rocker arm will be turned, raising the piston in the empty cylinder 10 and depressing the piston in the milk containing cylinder 10ᵃ. Suction will thereby be exerted in cylinder 10 and through the milking tubes leading from it, whereby milk will be drawn into the cylinder from two of the teats of each cow, while at the same time the drawn milk in cylinder 10ᵃ will be forced out through the port 21 into the milk receptacle below. When the pistons have almost reached the end of their stroke—preferably within an inch of it—the lug 7 of the rocker arm which has been moving to the right in unison with the movement of the power arm 4 to the left, will engage the adjusting screw on the forked arm 30 toward which it has been moving, and throw the valve rod 28 to the right, thereby sliding the valve 24 from right to left, so as to open the outlet port 21 from cylinder 10 and close the corresponding outlet port from cylinder 10ᵃ.

As the drive rod reverses its travel and moves again in the direction of the arrow in Fig. 3, the operations will be reversed, the piston 11ᵃ moving up in a suction stroke and milking the other two teats of both cows, while the piston 11 will move down in a pressure stroke and discharge the drawn milk from cylinder 10 to the pail below. This cycle of operations will be continued as long as the drive rod is reciprocated.

It should be observed that the pistons do not come into actual contact with the milk drawn into the pump cylinders, and that water is placed on top of the pistons both to lubricate the pistons and to make them tight.

Whenever it is desired the complete pumping unit can be readily detached from the four way rocker arm to which it is connected by merely disengaging the hooks or pins 14 from the holes 13 and lifting the apparatus from the keepers 18. It can then be removed to another station and connected up in a similar manner with the rocker arm at the new station, to milk another set of cows.

I claim as my invention:

1. Milking apparatus comprising a pair of upright pump cylinders having discharge ports at the bottom, pistons working in said cylinders, suction milking tubes leading directly into said cylinders below the pistons, a unitary valve member common to both of said cylinder ports, and a positive driving element operative both upon said pistons and upon said valve whereby to drive the pistons simultaneously in opposite directions and also to shift the valve at each stroke of the pistons.

2. Milking apparatus comprising a pair of upright pump cylinders having discharge ports at the bottom, pistons working in said cylinders, suction milking tubes leading directly into said cylinders below the pistons, a unitary valve member common to both of said cylinder ports, a driving element connected with said pistons and operative to drive the same simultaneously in opposite directions, and a valve lever extending upwardly from said valve into the path of said driving element whereby the same will be engaged and actuated to shift the valve at each stroke of the pistons.

3. Milking apparatus comprising a rocker arm, a pair of upright pump cylinders having discharge ports at the bottom, pistons working in said cylinders and operatively connected with the opposite ends of said rocker arm, whereby said pistons will be driven simultaneously in opposite directions, suction milking tubes leading directly into said cylinders below the pistons, and a unitary valve member common to both of said ports and operable by said rocker arm at each stroke of the pump pistons.

4. Milking apparatus comprising a rocker arm, a pair of upright pump cylinders having discharge ports at the bottom, pistons working in said cylinders, operative connections between said pistons and the opposite ends of said rocker arm, whereby said pistons will be driven simultaneously in opposite directions, milking tubes leading directly into said cylinders below the pistons, a unitary valve member common to both of said ports, and a valve lever pivotally connected with the valve and extending up into position to be engaged and thrown by the rocker arm near the end of each stroke of the pistons, whereby to inclose the port in the pressure cylinder and open the outlet in the suction cylinder.

5. Milking apparatus comprising a rocker arm having a downwardly extending unitary lug, a pair of pump cylinders arranged below said rocker arm and formed with outlet ports at the bottom, pistons working in said cylinders and operatively connected with the opposite ends of said rocker arm, whereby the pistons will be driven simultaneously in opposite directions, milking tubes leading directly into the cylinders below the pistons, a unitary sliding valve common to both of said ports, an oscillating valve lever pivotally connected with the valve and having at its upper end forked arms extending up on either side of the lug of the rocker arm, whereby said lever will be engaged and operated by the rocker arm at each stroke of the pistons.

6. Milking apparatus comprising a rocker arm having a downwardly extending lug, a pair of pump cylinders arranged below the rocker arm and having discharge ports at the bottom, pistons working in said cylinders and operatively connected with the opposite ends of the rocker arm, whereby the pistons will be driven simultaneously in opposite directions, milking tubes leading directly into said cylinders below the pistons, a unitary valve common to both of said ports, an oscillating valve lever having at its lower end slot and pin connection with said valve and having at its upper end forked arms extending up on either side of the lug of the rocker arm, and means for adjusting the distance between the forked arms, so as to regulate the time of operation of the valve.

7. Milking apparatus comprising a rocker arm having a downwardly extending lug, a pair of pump cylinders arranged below said rocker arm and having discharge ports at the bottom, pistons working in said cylinders and operatively connected with the opposite ends of said rocker arm, milking tubes leading directly into said cylinders below the pistons, a unitary valve common to both of said ports, an oscillatory valve lever connected with the valve at its lower end and having at its upper end forked arms extending up on either side of said lug, and adjusting screws threaded through the forked arms of said lever and capable of adjustment to regulate the time of operation of the valve.

8. The combination with an oscillatory rocker arm, of a milking unit comprising a pair of upright cylinders having valved discharge ports at their lower ends, pistons working in said cylinders, piston rods extending upwardly from said pistons, and suction milking tubes leading into said cylinders below the pistons, said rocker arm having on each side of its axis of rotation a longitudinal slideway terminating in a hole, and said pistons having at their upper ends inturned pins receivable in said slideways and holes.

9. In milking apparatus, the combination with a horizontally reciprocating driving rod, and a fixed support, of a unitary four way rocker arm journaled upon said support and comprising an upwardly extending power arm pivotally connected with said driving rod, a downwardly extending valve operating lug, and a cross bar, and a unitary milking structure removably supported below the rocker arm and comprising a pair of pump cylinders, pistons removably hung from the opposite ends of said cross arm, milking tubes leading into said cylinders in advance of the pistons, a unitary valve at the bottom of said cylinders, and a valve rod having operative connection with said valve and extending up on either side of said lug and into the path of travel thereof.

In testimony whereof I affix my signature in presence of two witnesses.

KENNETH K. McLEOD.

Witnesses:
ARTHUR P. LOTHROP,
H. SWANSON.